United States Patent [19]
Nelson

[11] 3,730,226
[45] May 1, 1973

[54] AIR RELAY VALVE

[75] Inventor: Thomas W. Nelson, Wilsonville, Oreg.

[73] Assignee: Omark Industries, Inc., Portland, Oreg.

[22] Filed: Oct. 13, 1971

[21] Appl. No.: 188,806

[52] U.S. Cl. ...................... 137/627.5, 92/8, 251/48
[51] Int. Cl. .............................................. B60t 13/24
[58] Field of Search ........................ 137/627.5; 92/8, 92/11; 251/48; 303/54, 59

[56] References Cited

UNITED STATES PATENTS

| 3,525,555 | 8/1970 | Meyer et al | 137/627.5 X |
| 2,476,054 | 7/1949 | Loweke | 303/54 |

FOREIGN PATENTS OR APPLICATIONS

| 902,321 | 8/1962 | Great Britain | 137/627.5 |

*Primary Examiner*—Robert G. Nilson
*Attorney*—Robert L. Harrington

[57] ABSTRACT

An air relay valve including an enclosed housing separated into an air supply chamber and a control chamber by a flexible diaphragm Air pressure introduced into the control chamber flexes the diaphragm into the air supply chamber. This opens the air supply chamber to an air pressure source with ports directing the air pressure from the air supply chamber into air lines that activate, e.g., air brakes. The relay valve is further designed whereby the inlet from the air pressure source is kept open until the pressure on both sides of the diaphragm are equalized causing return of the diaphragm and automatic closing of the air pressure source. The present invention is characterized in providing a diaphragm wherein the two sides have equal surface areas exposed to the air pressure so that automatic shut off occurs at the point when the p.s.i. of the air in the air lines substantially equals the p.s.i. of the air in the control chamber with exhausting of the air pressure occurring through an exhaust port in direct communication with the air supply chamber. A further improvement is the inclusion of a dampening chamber to dampen vibration of the diaphragm assembly.

2 Claims, 2 Drawing Figures

Patented May 1, 1973
3,730,226
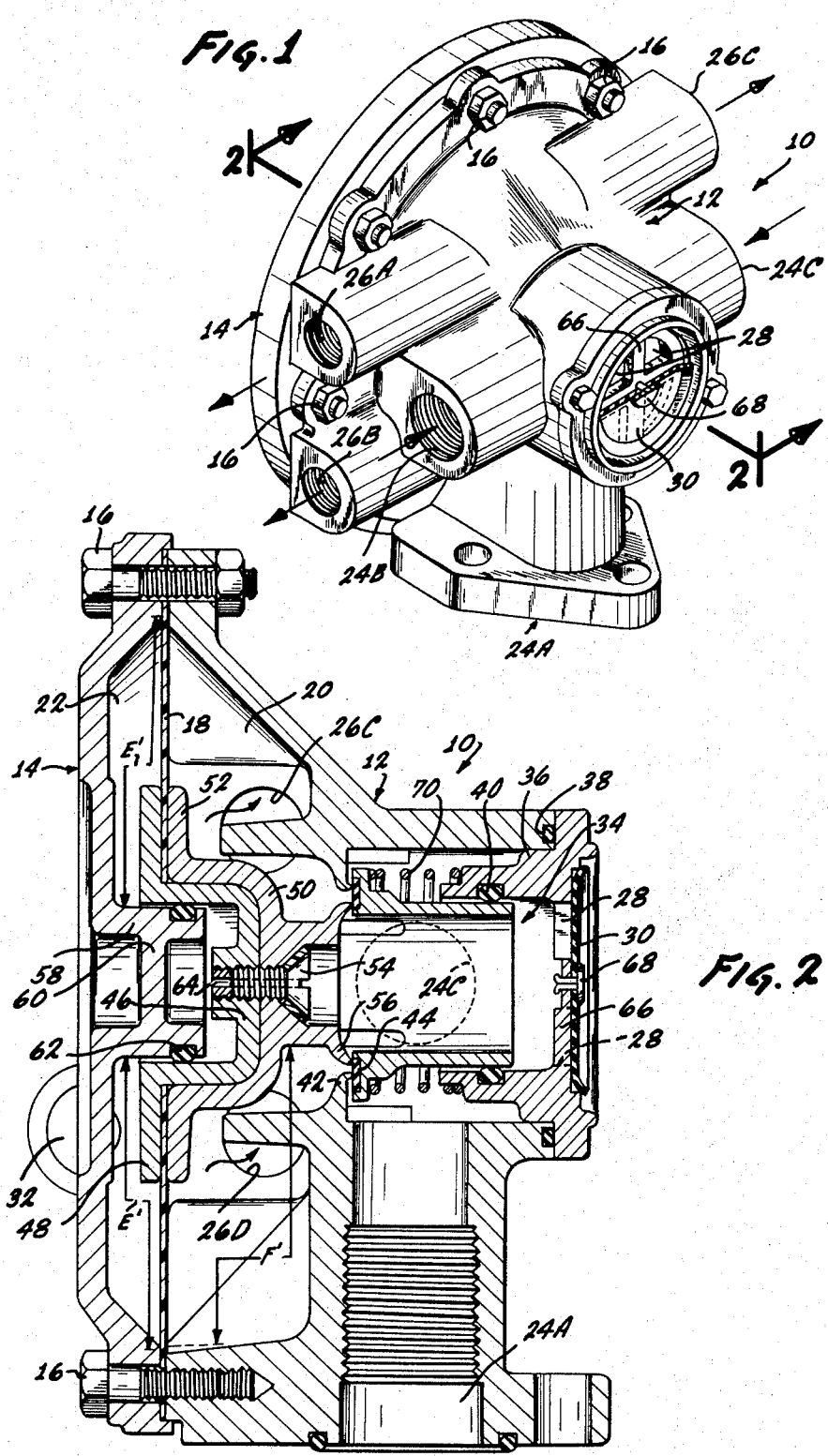

з,730,226

AIR RELAY VALVE

HISTORY

This invention relates to air valves and more particularly to air relay valves used in large trucks for supplying air pressure to air brakes.

Air relay valves as contemplated for the present invention are used to open and close the air supplied from an air source, e.g., a tank filled with compressed air. The valve is activated by a second air supply commonly referred to as a pilot or signal. This pilot air pressure is directed to one side of a flexible diaphragm enclosed within the valve and separating the valve into a central chamber receiving the pilot air pressure and an air supply chamber. The pilot air pressure is produced by an operator of the vehicle, e.g., by engaging a brake treadle. Engaging the treadle releases air into the pilot line, e.g., of 100 p.s.i. The main air source is opened to the air supply chamber of the valve by the flexing of the diaphragm whereby air pressure is built up in the valve and through the air lines to the brakes. Upon sufficient build up of air in the air supply chamber of the valve, i.e., on the side of the diaphragm opposite the side controlled by the pilot, the diaphragm is returned to its initial position which closes off the main air source.

It is a requirement for such valves that the air pressure created in the air supply chamber, i.e., that side of the diaphragm in communication with the main air source, substantially duplicate the air pressure provided in the pilot air pressure line, i.e., by operation of the brake treadle. It will be understood that unless the surface area of the diaphragm affected by the air pressure on each side of the diaphragm is equal, and without special off setting mechanism, the air pressure cannot be the same. Because of the mechanism connected to the diaphragm to activate the valve, such off setting mechanism is required. The present invention is believed to provide a design greatly simplified to that of prior relay valves which design provides desirable features not found in such prior valves while providing substantially equal pressure on the two sides of the diaphragm.

In the present invention the mechanism designed for the air supply chamber of the valve, i.e., the chamber opened to the air source and air brake, is provided with the required mechanism responsive to the diaphragm to open and close the air line to the main air supply. The total effective area against which the air pressure acts on that side of the diaphragm is calculated. The total surface area on the control chamber side of the diaphragm is then calculated to determine the surface area that must be removed to equal the effective area on the opposite side. A column is provided from the wall of the valve and extends into a cup shaped member formed as a center section of the diaphragm. An appropriate seal such as an O-ring seals the space around the column. The cross section of the column then determines that surface area which is not being effected by the air pressure and as the remaining effective area equals that on the opposite side of the diaphragm, the diaphragm will be at rest only when the p.s.i. on each side is equal. Furthermore, a pocket is formed between the central chamber of the diaphragm and the stationary column providing compression and vacuum (depending on the movement of the diaphragm) to resist rapid movement of the diaphragm assembly and essentially dampen undesired vibration thereof.

The invention and its advantages will be more clearly understood by reference to the following detailed description and drawings wherein:

FIG. 1 is a perspective view of an air relay valve in accordance with the present invention; and FIG. 2 is a cross section view taken on section lines 2—2 of FIG. 1.

Referring to FIG. 1, an air relay valve 10 is provided with a housing comprised of a primary section 12 and a secondary section 14. These sections are clamped together by bolts 16 and as will be seen by reference to FIG. 2, the mating surfaces 12A and 14A of sections 12 and 14 provide a smooth airtight clamp for securing a diaphragm 18 between the sections to effectively seal the interior of the housing against air leakage, which also separates the interior into two chambers referred to as an air supply chamber 20 and a control chamber 22.

Nine openings are provided to the interior of the housing. Three are air supply inlet portals 24A, 24B and 24C. This plurality of inlet ports are provided for the convenience of the air system designer. One air inlet may be all that is required and the other two plugged without affecting the operation of the valve. Exit portals 26A, 26B, 26C and 26D are provided for directing the air from the air supply chamber 20 and through lines which convey the air pressure, e.g., to air brakes. Again the four portals are provided for flexibility of design and the air system may require less than all of the portals with the extra ones plugged without affecting the operation of the valve. Air exhaust is provided through opening 28 past a one way air release valve provided by a rubber disc 30. The air pilot inlet 32 is hidden from view in FIG. 1, but shown in the cross section view of FIG. 2.

Referring now more specifically to FIG. 2, a check valve 34 is designed to slide axially with respect to the diaphragm 18, within a collar portion 36 of the housing section 12. This collar section is separate from, but sealed to the housing by O-ring 38. The space around the check valve is sealed by O-ring 40. With the diaphragm 18 in the rest position as shown in FIG. 2., the check valve 34 is in its far left position and seated against a stationary lip 42 extended from the inside wall of the housing section 12. The openings from each of the air supply inlet portals 24A, 24B and 24C are closed from the main interior of the valve while the check valve rests against this stationary lip 42. Sealing is insured by a sealing ring 44 carried by the check valve and adapted to engage the stationary lip 42.

The center section of the diaphragm is provided with a first cup shaped member 46 having a clamping flange 48 on one side of the diaphragm and a second cup shaped member 50 having a flange 52 on the other side of the diaphragm. The cup shaped members are clamped tightly together by a screw 54. The flanges 48 and 52 are designed to fit tightly together to securely hold and seal against the diaphragm 18. Cup shaped member 50 is provided with a lip portion 56 which engages the sealing ring 44 carried by the check valve 34. The housing section 14 is provided with a column 58 which extends into the interior of the cup shaped member 48. A wall 60 forms an enclosed end for the column and O-ring 62 seals around the column with respect to the inside wall of cup member 48. The collar portion 36 and exhaust opening 28 provided therethrough includes web segments 66 across the opening 28 which support the rubber disc 30 fastened thereto by fastener 68.

OPERATION

The valve described above functions in the following manner: Air pressure from an air source is supplied to one or more of the air inlets 24A, 24B, 24C. Air lines are connected to portals 26A, 26B, 26C and 26D which air lines are connected to the air brakes of the vehicle. The pilot air inlet 32 is connected to the brake treadle in the cab of the vehicle which brake treadle controls air from a secondary source to be directed to the pilot air inlet 32. The operator, by engaging the brake treadle creates in the control air chamber 22 an air pressure as determined by the extent to which the treadle valve is opened with a maximum determined by the air source to the brake treadle. The effective area $E'$ of the diaphragm 18 is exposed to the air pressure from the brake treadle which causes flexing of the diaphragm. This flexing causes movement of the cup shaped members 46, 50. The lip 56 of cup shaped member 50 engaging the sealing ring 44 of the check valve forces movement of the check valve against the spring pressure of the spring 70. It is to be noted that the cup shaped member 46 slides on column 58 during such movement. Movement of the check valve permits air pressure from the air inlet to flow past the stationary lip 42 into the air supply chamber 20 and out the exit portals 26A, 26B, 26C and 26D. As the pressure against the effective area $F'$ of the diaphragm (the side opposite $E'$) is balanced against the air pressure on the side $E'$ of the diaphragm, the diaphragm returns (by aid of spring 70) until the check valve is again seated against the stationary lip 42. With the diaphragm in rest position and with the brake pedal continued being engaged, a constant air pressure is maintained in the air lines connected to the portals 26A, 26B, 26C and 26D and the brakes of the vehicle are actuated. Release of the brake treadle again creates an unbalanced effect on the diaphragm, but in this instance with a greater pressure on the $E''$ side of the diaphragm and the cup shaped member 46 is moved further onto the column 58. The lip portion 56 of the cup 50 is disengaged from the sealing ring 44, and air pressure from the air supply chamber 20 flows past the lip 56 to the interior of the check valve 34 through opening 28 and past the rubber disc 30 to be exhausted to the atmosphere.

It will be understood that movement of cup shaped member 46 along column 60 tends to create a pocket of alternating compressed and vacuum air pressure. A bleed hole 64 in the screw provides relief to this pocket. However, the escape and suction of air therethrough is controlled to effectively dampen rapid movement or vibration of the diaphragm assembly.

Having thus disclosed a preferred embodiment of the invention, those skilled in the art will envision numerous changes and modifications. Accordingly, the invention is not limited to the embodiment shown, but rather is to be determined by reference to the claims appended hereto:

What is claimed is:

1. An air relay valve comprising: a housing, a movable partition separating the interior of the housing into a control chamber and an air supply chamber, an air inlet, an air outlet and an exhaust portal provided to the air supply chamber, a pilot air inlet provided to the air control chamber, valve means controlling opening and closing of the air inlet and exhaust portal that is responsive to the movement of the partition to open and close said air inlet and exhaust portal, a cup shaped member fixed to one of the housing and the partition and extended into the air control chamber, a column member fixed to the other of the housing and the partition and extended into the cup shaped member, said cup shaped member and column member defining an enclosure separated from the air pressure provided to the air control chamber which enclosure expands and contracts with movement of the partition whereby resulting pressure differences within the enclosure dampens vibrations of the partition.

2. An air relay valve as defined in claim 1 wherein the enclosure defined by the column member and cup shaped member is communicated with atmospheric pressure by a restricted bleed hole.

* * * * *